(12) United States Patent
Sugawa et al.

(10) Patent No.: US 9,294,698 B2
(45) Date of Patent: Mar. 22, 2016

(54) SOLID-STATE IMAGE PICKUP APPARATUS

(71) Applicants: Tohoku University, Miyagi (JP); OLYMPUS CORPORATION, Tokyo (JP)

(72) Inventors: Shigetoshi Sugawa, Miyagi (JP); Nana Akahane, Tokyo (JP); Satoru Adachi, Ibaraki (JP)

(73) Assignees: Tohoku University, Miyagi (JP); Olympus Corporation, Tokyo (JP)

( * ) Notice: Subject to any disclaimer, the term of this patent is extended or adjusted under 35 U.S.C. 154(b) by 0 days.

(21) Appl. No.: 14/513,674

(22) Filed: Oct. 14, 2014

(65) Prior Publication Data

US 2015/0029376 A1 Jan. 29, 2015

Related U.S. Application Data

(63) Continuation of application No. PCT/JP2013/060558, filed on Apr. 5, 2013.

(30) Foreign Application Priority Data

Apr. 19, 2012 (JP) ................................ 2012-095785

(51) Int. Cl.
| | |
|---|---|
| H04N 5/359 | (2011.01) |
| H04N 5/357 | (2011.01) |
| H04N 5/3745 | (2011.01) |
| H04N 5/374 | (2011.01) |
| H04N 5/378 | (2011.01) |

(52) U.S. Cl.
CPC ............. *H04N 5/359* (2013.01); *H04N 5/3575* (2013.01); *H04N 5/374* (2013.01); *H04N 5/378* (2013.01); *H04N 5/3745* (2013.01); *H04N 5/37457* (2013.01)

(58) Field of Classification Search
None
See application file for complete search history.

(56) References Cited

U.S. PATENT DOCUMENTS

| | | |
|---|---|---|
| 2005/0018065 A1 | 1/2005 | Tashiro et al. |
| 2008/0309800 A1 | 12/2008 | Olsen et al. |
| 2009/0207293 A1 | 8/2009 | Ryoki et al. |
| 2009/0290057 A1 | 11/2009 | Ohtsuki |
| 2009/0322917 A1 | 12/2009 | Kyogoku et al. |
| 2012/0033117 A1 | 2/2012 | Murata et al. |

FOREIGN PATENT DOCUMENTS

| | | |
|---|---|---|
| JP | 2000-004399 A | 1/2000 |
| JP | 2001-045375 A | 2/2001 |
| JP | 2009-044462 A | 2/2009 |
| JP | 2009-283599 A | 12/2009 |
| JP | 2010-010896 A | 1/2010 |
| JP | 2011-142592 A | 7/2011 |

OTHER PUBLICATIONS

Extended Supplementary European Search Report dated Jul. 15, 2015 from related European Application No. 13 77 7619.1.
Kagawau, K., et al., "A 3.6pW/frame.pixel 1.35V PWM CMOS Imager with Dynamic Pixel Readout and no Static Bias Current", Solid-State Circuits Conference, ISSCC 2008, Digest of the Technical Papers, IEEE International, IEEE, Piscataway, NJ, USA, pp. 54, 55 and 595.
International Search Report dated May 28, 2013 issued in PCT/JP2013/060558.

*Primary Examiner* — Albert Cutler
(74) *Attorney, Agent, or Firm* — Scully, Scott, Murphy & Presser, P.C.

(57) ABSTRACT

A solid-state image pickup apparatus includes: two-dimensionally arrayed unit pixels, each including a PD performing optical-electrical conversion of an incident light; an FD and an output terminal provided for each of pixel groups, each including one or more pixels, the terminal being capable of outputting a noise signal and a signal-noise sum signal separately; first lines to which the terminals are connected in common and which are capable of holding voltages based on signals outputted from the terminals; second lines provided in parallel with the first lines and capable of holding a voltage; inter-transfer-line capacitive elements connecting the second lines and the first lines; a reset switch resetting each of the second lines to a reset voltage; a readout switch provided for each of the second lines; and a third line to which the second lines are connected in parallel via the readout switches, respectively.

3 Claims, 12 Drawing Sheets

SOLID-STATE IMAGE PICKUP APPARATUS

CROSS-REFERENCE TO RELATED APPLICATIONS

This is a continuation of International Application PCT/JP2013/060558, with an international filing date of Apr. 5, 2013, which is hereby incorporated by reference herein in its entirety.

This application is based on Japanese Patent Application No. 2012-095785, filed on Apr. 19, 2012, the contents of which are incorporated herein by reference.

TECHNICAL FIELD

The present invention relates to a solid-state image pickup apparatus.

BACKGROUND ART

Conventionally, there has been known an amplification-type solid-state image pickup apparatus which converts signal charges accumulated by an optical-electrical conversion element to signal voltage in pixels and then outputs the signal voltage to a signal line, as represented by a CMOS (complementary metal-oxide semiconductor) image sensor (see, for example, PTL 1). In this solid-state image pickup apparatus, all vertical signal lines are provided with two capacitive elements which cause voltage which occurs at the time of resetting a charge-voltage conversion element in a pixel (hereinafter referred to as noise voltage) and voltage obtained by adding a signal charge generated by optical-electrical conversion to the noise voltage (hereinafter referred to as signal-noise sum voltage) to be outputted from the charge-voltage conversion element in the pixel and held separately.

This solid-state image pickup apparatus is configured so as to perform noise removal by, after holding noise voltages from all pixels of a line selected by a vertical shift register and signal-noise sum voltages into the capacitive elements, outputting the noise voltages and the signal-noise sum voltages from the two capacitive elements provided for a column selected by a horizontal shift register and calculating difference between these voltages by a CDS circuit.

CITATION LIST

Patent Literature

{PTL 1}
Japanese Unexamined Patent Application, Publication No. 2000-4399

SUMMARY OF INVENTION

Solution to Problem

The present invention provides the following solutions.

An aspect of the present invention is a solid-state image pickup apparatus provided with: a plurality of two-dimensionally arrayed unit pixels, each of the unit pixels including an optical-electrical conversion element performing optical-electrical conversion of an incident light; a charge conversion element and an output terminal provided for each of a plurality of pixel groups, each pixel group including one or more of the unit pixels, the charge conversion element converting a signal charge optical-electrical converted by the optical-electrical conversion element of each of the unit pixels in the pixel group to voltage or current, and the output terminal being capable of outputting a noise signal that occurs at the time of resetting the charge conversion element and a signal-noise sum signal obtained by adding a signal that has occurred by optical-electrical conversion to the noise signal separately; a plurality of first transfer lines to which the output terminals of a plurality of the pixel groups are connected in common, the plurality of first transfer lines being capable of holding voltages based on signals outputted from the output terminals; a plurality of second transfer lines provided in parallel with the first transfer lines, the plurality of second transfer lines being capable of holding a voltage; inter-transfer-line capacitive elements connecting the second transfer lines and the first transfer lines; a reset switch resetting each of the second transfer lines to a reset voltage; a readout switch provided for each of the second transfer lines; and a third transfer line to which the second transfer lines are connected in parallel via the readout switches, respectively.

DESCRIPTION OF EMBODIMENTS

First Embodiment

A solid-state image pickup apparatus 1 according to a first embodiment of the present invention will be described below with reference to drawings.

Figure 1:
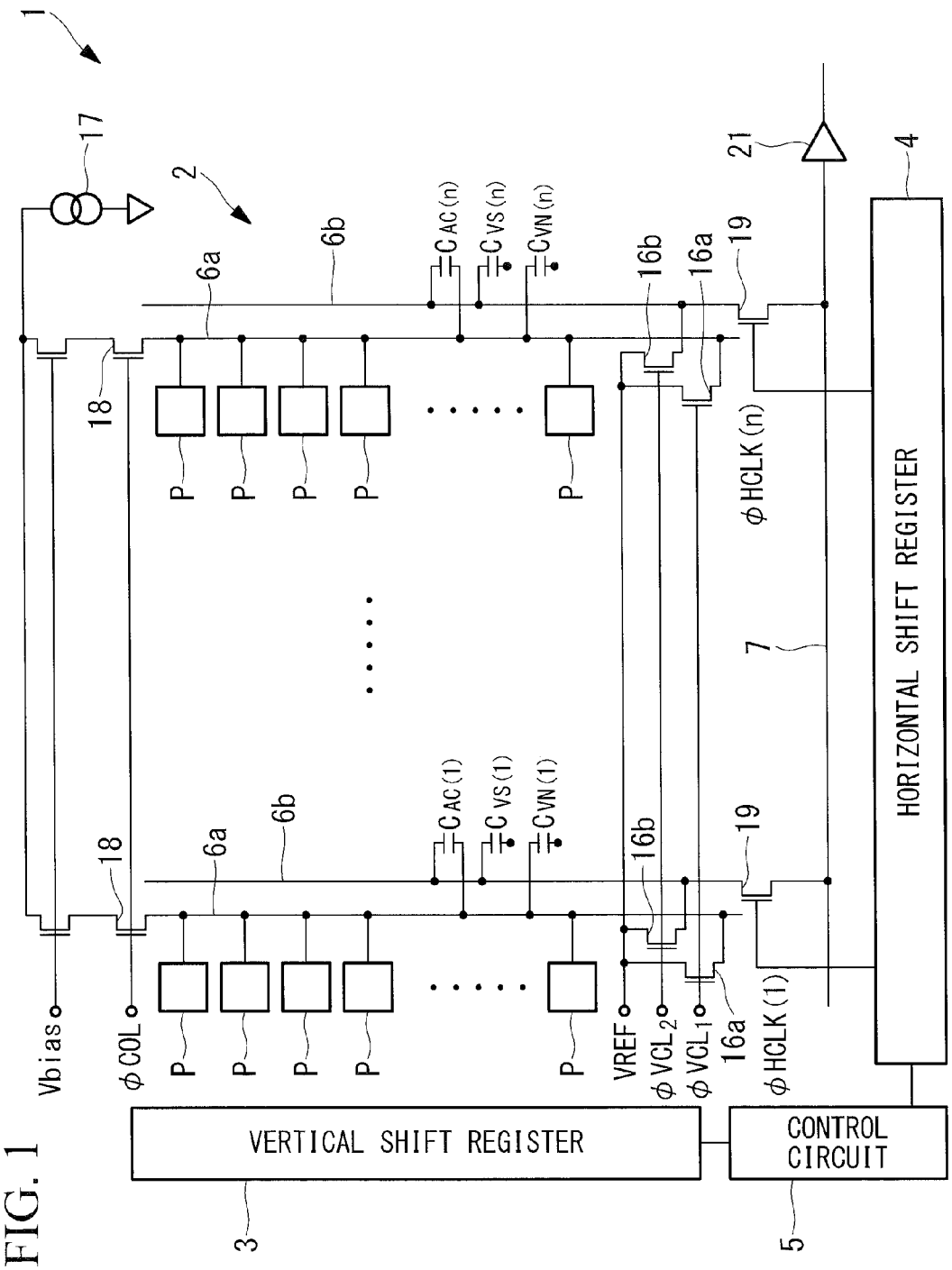
FIG. 1 is a circuit diagram showing a configuration of a solid-state image pickup apparatus according to a first embodiment of the present invention.

As shown in FIG. 1, the solid-state image pickup apparatus 1 according to the present embodiment is provided with: a pixel array 2 provided with a plurality of pixels P, a vertical shift register 3, a horizontal shift register 4 and a control circuit 5 which controls these shift registers 3 and 4.

The pixel array 2 is provided with: the plurality of pixels P arrayed in a matrix shape, that is, in a state that a predetermined number of pixels are arrayed in line and column directions; a plurality of first vertical signal lines (first transfer lines) 6a, to which a plurality of pixels P belonging to the same column are connected in common; a plurality of second vertical signal lines (second transfer lines) 6b which extend in parallel with each of the first vertical signal lines, and a horizontal signal line (third transfer line) 7 to which the plurality of second vertical signal lines 6b are connected in common. In the present embodiment, one pixel P constitutes one pixel group.

Figure 2:
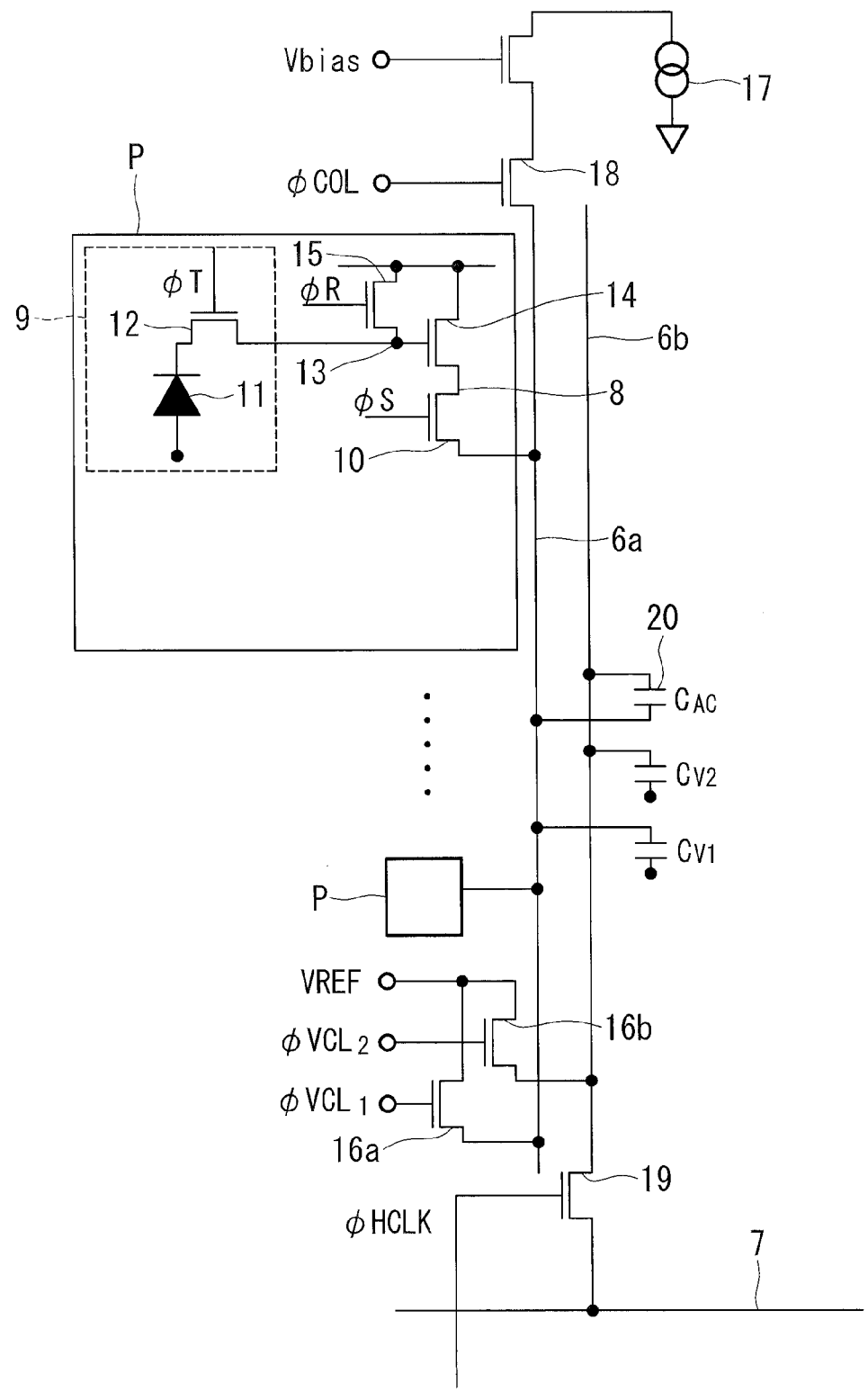
FIG. 2 is a circuit diagram showing a configuration of a column circuit including pixels which is provided for the solid-state image pickup apparatus of FIG. 1.

As shown in FIG. 2, each pixel P is provided with: a unit pixel 9; a floating diffusion (FD; charge conversion element) 13 which converts a signal charge outputted from the unit pixel 9 to voltage; an amplifier transistor 14 which reads out signal charges accumulated in the FD 13 as voltage; an FD reset transistor 15 which is connected between the amplifier transistor 14 and a transfer transistor 12 and which resets voltage of the FD 13; and selection transistor 10 arranged between output line (output terminal) 8 of the amplifier transistor 14 and first vertical signal lines 6a.

Each unit pixel 9 is provided with a photo diode (PD, optical-electrical conversion element) 11 which performs optical-electrical conversion of a received optical signal and accumulates signal charges, and the transfer transistor 12 which transfers the signal charges accumulated in the PD 11.

The source of the amplifier transistor 14 is connected to the output line 8. The amplifier transistor 14 is adapted to current-amplify signal voltage of the FD 13 connected to its gate and outputs the signal to the output line 8. Specifically, by an FD reset pulse TR being inputted to the gate of the FD reset transistor 15 from the vertical shift register 3, the gate of the amplifier transistor 14 enters an active state and enters a readout enabled state. At the same time, a signal charge transferred to the FD 13 is discharged to the drain side of the FD reset transistor 15. Thereby, the voltage of the FD 13 is reset.

The transfer transistor 12 is adapted to, by a transfer pulse $\phi T$ being inputted to its gate, transfer signal charges accumulated by the PD 11 from the PD 11 on the source side to the FD 13 on the drain side. The $\phi T$ signal to the transfer transistor 12 is inputted for each column. The amount of signal charge accumulated by the PD 11 is reset to zero by this transfer operation. The FD 13 is adapted to generate signal voltages corresponding to the signal charges transferred from the PD 11 via the transfer transistor 12.

The selection transistor 10 is adapted to, by a noise readout pulse $\phi S$ being inputted to the gate, output a signal corresponding to signal voltage generated in the FD 13, from the amplifier transistor 14 on the drain side to the first vertical signal line 6a on the source side.

Each of the vertical signal lines 6a and 6b is provided with a reset part which resets its electric potential. The reset parts are configured with signal line reset transistors (reset switches) 16a and 16b which, by reset pulses $\phi VCL_1$ and $\phi VCL_2$ being inputted to their gates, reset the vertical signal lines 6a and 6b to VREF, respectively.

The first vertical signal line 6a is provided with a constant current source connection switch 18 which is arranged between the first vertical signal line 6a and a constant current source 17 and which switches between electrical connection and disconnection between the first vertical signal line 6a and the constant current source 17.

The second vertical signal line 6b is provided with a vertical signal line selection switch (readout switch) 19 which switches between electrical connection and disconnection between the second vertical signal line 6b and a horizontal signal line 7.

Furthermore, between the first vertical signal line 6a and the second vertical signal line 6b, there is provided a capacitive element ($C_{AC}$) 20 which connects both of the vertical signal lines 6a and 6b.

The vertical shift register 3 is adapted to, by selecting one line from the pixel array 2 and inputting the pulses $\phi R$, $\phi T$, $\phi S$ to pixels P belonging to the selected line, cause a signal to be outputted from each pixel P to first vertical signal lines 6a.

The horizontal shift register 4 is adapted to, by inputting a vertical signal line selection pulse $\phi HCLK$ to the vertical signal line selection switch 19, cause a signal to be outputted to the horizontal signal line 7 from second vertical signal lines 6b to which the vertical signal line selection pulse $\phi HCLK$ has been inputted.

The control circuit 5 is adapted to, by outputting a control signal for causing each pulse described above to be outputted to the vertical shift register 3 and the horizontal shift register 4 in accordance with a pulse sequence set in advance, control an operation of reading out a signal from the pixel array 2.

In FIGS. 1 and 2, signs $C_{V1}$ and $C_{V2}$ denote parasitic capacitances of the vertical signal lines 6a and 6b, respectively.

Figure 3:
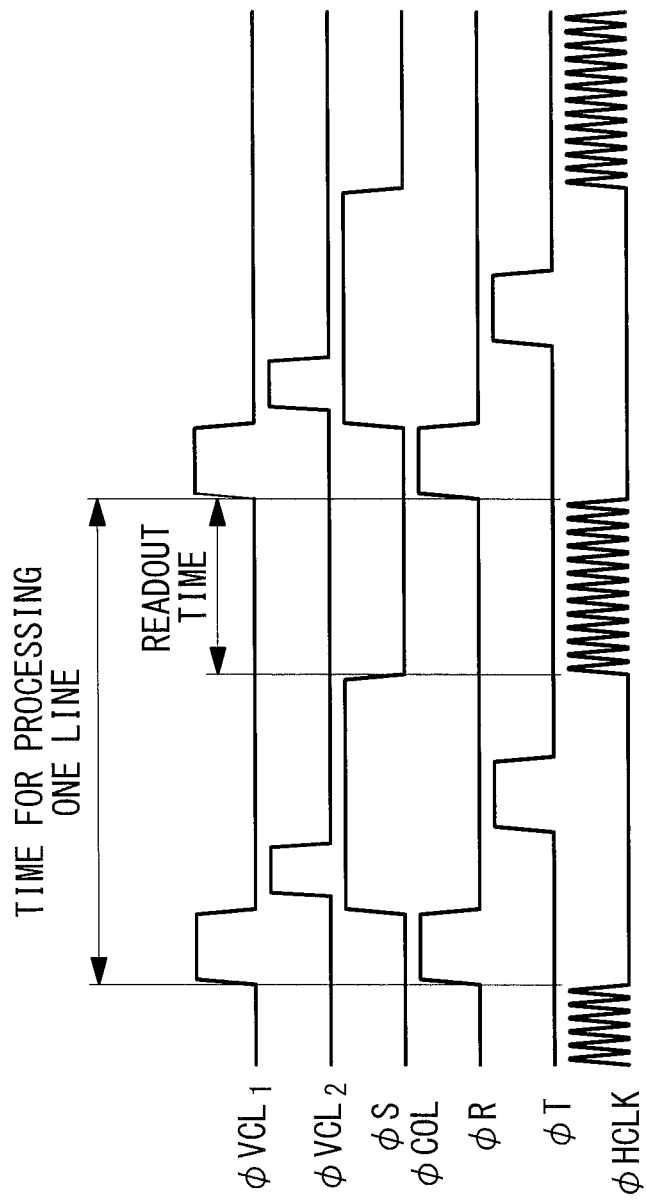
FIG. 3 is a timing chart showing an operation of the solid-state image pickup apparatus of FIG. 1.

Next, a method for driving the solid-state image pickup apparatus 1 configured as above will be described with reference to a timing chart in FIG. 3.

The solid-state image pickup apparatus 1 according to the present embodiment reads out voltage related to an optical signal received by a pixel P and voltage related to noise which occurs at the time of resetting the FD 13 (hereinafter referred to as "noise voltage (a noise signal)"). Here, the voltage related to an optical signal received by the pixel P includes the above-described noise voltage which occurs at the time of resetting the FD 13. That is, in the solid-state image pickup apparatus 1 according to the present embodiment, by reading out the noise voltage and voltage obtained by adding the voltage related to an optical signal received by the pixel P to the noise voltage (hereinafter referred to as "signal-noise sum voltage (a signal-noise sum signal)") separately to the first vertical signal line 6a, a difference between the signal-noise sum voltage and the noise voltage which appears in the second vertical signal line 6b is outputted to the horizontal signal line 7.

First, the operation of outputting the noise voltage to a first vertical signal line 6a and causing the noise voltage to be held temporarily is performed as shown below.

First, in a state that the constant current source connection switch 18 of all the first vertical signal lines 6a are disconnected, the reset pulse $\phi VCL_1$ is applied to the signal line reset transistor 16a which constitutes the reset part of each of the vertical signal lines 6a, and the first vertical signal lines 6a are reset to the electric potential VREF. At the same time, by the FD reset pulse $\phi R$ being applied to each of pixels P belonging to a line to be an output target, from the vertical shift register 3, the electric potential of the FD 13 is reset, and the amplifier transistors 14 of the selected pixels P electrically connect.

By inputting a pulse $\phi COL$ to the gates of the constant current source connection switch 18 provided for the first vertical signal lines 6a in this state, the constant current source connection switch 18 enters an ON state, and a constant current flows through the first vertical signal lines 6a. At the same time, by the noise readout pulse $\phi S$ being inputted to the gates of the selection transistor 10 of the output line 8 connected to the first vertical signal lines 6a, the selection transistor 10 electrically connects, and the noise voltage of the FD 13 which has been reset is outputted to the first vertical signal lines 6*a*. Then, by stopping input of the pulse φCOL after holding the input for a predetermined time, and switching the constant current source connection switch 18 to an OFF state, the first vertical signal lines 6*a* enter a floating potential state, and the noise voltage is held temporarily in the parasitic capacitances of the first vertical signal lines 6*a*.

Next, in a state that the noise voltage is held in all the first vertical signal lines 6*a*, the reset pulse φVCL$_2$ is applied to the signal line reset transistors 16*b* constituting the reset parts of all the second vertical signal lines 6*b*, and the second vertical signal lines 6*b* are reset to the already-known electric potential VREF.

Then, after that, by the transfer pulse φT being applied to the gate of the transfer transistor 12 of each pixel P belonging to a line to be an output target, from the vertical shift register 3, signal charges accumulated by the PD 11 are transferred from the PD 11 to the FD 13, and the electric potential of the FD 13 is set to the signal-noise sum voltage.

In this state, the amplifier transistor 14 is in an electrical connection state. Therefore, the electric potential of the first vertical signal line 6*a* is changed from the noise voltage to the signal-noise sum voltage.

In this case, in the solid-state image pickup apparatus according to the present embodiment, since the first vertical signal line 6*a* and the second vertical signal line 6*b* are connected via the capacitive element 20, the electric potential of the second vertical signal line 6*b* changes by a difference between the signal-noise sum voltage and the noise voltage due to a coupling effect by the capacitive element 20 when the electric potential of the first vertical signal line 6*a* changes from the noise voltage to the signal-noise sum voltage.

Then, at the time point when signal-noise sum voltages from all the pixels P in the same line are outputted to the first vertical signal line 6*a*, the vertical signal line selection pulse φCLK is applied to the vertical signal line selection switch 19 from the horizontal shift register 4.

Thereby, the difference between the signal-noise sum voltage and the noise voltage held in the second vertical signal line 6*b* is read out to the horizontal signal line 7. The horizontal signal line 7 is provided with a signal amplifier 21, and a pixel signal, which is the read-out difference between the noise voltage and the signal-noise sum voltage, is amplified by the signal amplifier 21 and outputted.

Then, by sequentially reading out the difference between the noise voltage and the signal-noise sum voltage from all the second vertical signal lines 6*b* to the horizontal signal line 7, pixel signals corresponding to one line can be obtained. Therefore, by sequentially changing the line to be selected, by the vertical shift register 3, and performing the same process, pixel signals of all the pixels P can be outputted to acquire one image.

As described above, according to the solid-state image pickup apparatus 1 according to the present embodiment, only by noise voltage and signal-noise sum voltage separately outputted from the same pixel P being separately outputted to the first vertical signal line 6*a*, a difference between the signal-noise sum voltage and the noise voltage which appears in the second vertical signal line 6*b* can be read out to the horizontal signal line 7. As a result, it is possible to, immediately after reading out the noise voltage, read out the signal-noise sum voltage within a short time. As a result, there is an advantage that it is possible to output a signal with a high noise immunity even if output of the pixels P fluctuates during a readout period.

Furthermore, only by the noise voltage and the signal-noise sum voltage separately outputted from the same pixel P being separately outputted to the first vertical signal line 6*a*, the difference between the signal-noise sum voltage and the noise voltage which appears in the second vertical signal line 6*b* can be outputted to the horizontal signal line 7, and it is not necessary to provide a circuit like a differential amplifier at its subsequent stage. Therefore, there is an advantage that the configuration can be simplified and downsized.

Second Embodiment

Next, a solid-state image pickup apparatus 30 according to a second embodiment of the present invention will be described with reference to drawings. In description of the present embodiment, parts common to components of the solid-state image pickup apparatus 1 according to the first embodiment stated above are given the same signs, and description thereof will be omitted.

Figure 4:
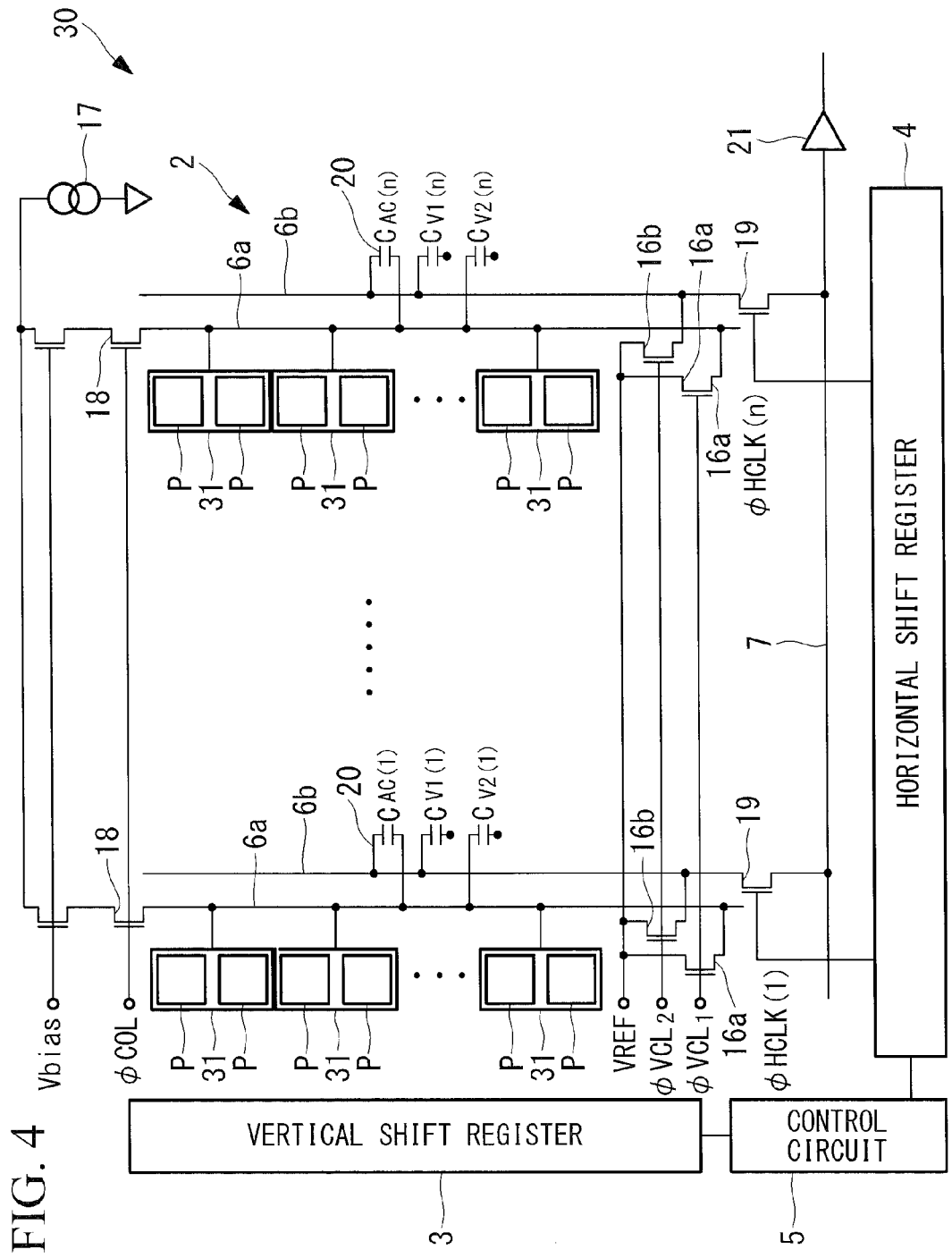
FIG. 4 is a circuit diagram showing a configuration of a solid-state image pickup apparatus according to a second embodiment of the present invention.

The solid-state image pickup apparatus 30 according to the present embodiment is different from the solid-state image pickup apparatus 1 according to the first embodiment in that, though the solid-state image pickup apparatus 1 is provided with the amplifier transistor 14, the FD reset transistor 15 and the selection transistor 10 in each of all the pixels P, 2 pixels P arranged in the columnar direction share the amplifier transistor 14, the FD reset transistor 15 and the selection transistors 10 as shown in FIG. 4.

Figure 5:
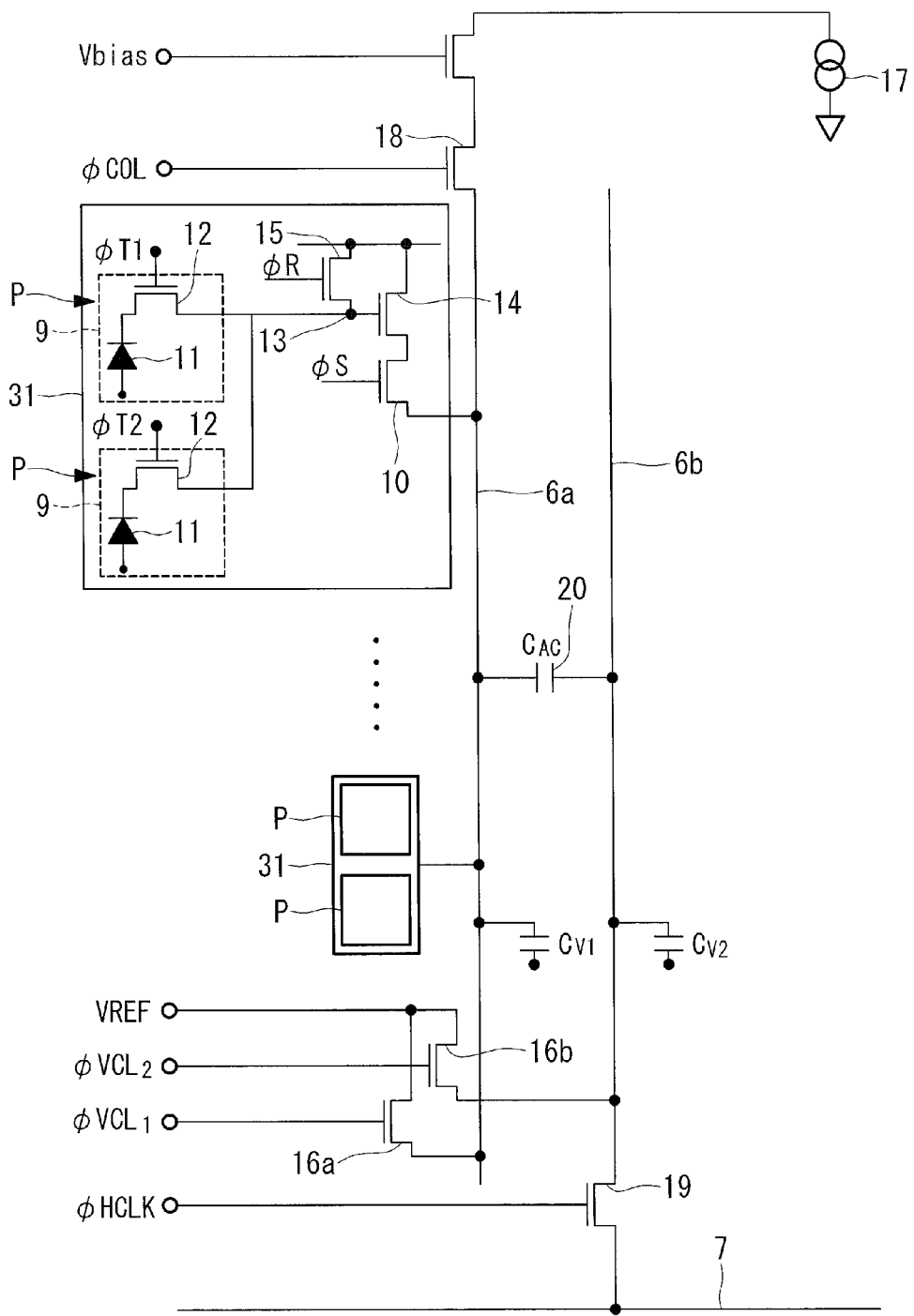
FIG. 5 is a circuit diagram showing a configuration of a column circuit including pixels which is provided for the solid-state image pickup apparatus of FIG. 4.

That is, in a pixel group 31 including two unit pixels 9 arrayed in a square array of 2×2 in the solid-state image pickup apparatus 30 according to the present embodiment, each unit pixel 9 is provided with the PD 11 and the transfer transistor 12; the drain sides of all the transfer transistors 12 are connected to the common FD 13; and the single FD reset transistor 15 which resets the FD 13, the amplifier transistor 14 which reads out signal charges accumulated in the FD 13 as voltage, and the selection transistor 10 provided for output line 8 connected to the source side of the amplifier transistor 14, are shared by each pixel group 31, as shown in FIG. 5.

Figure 6:
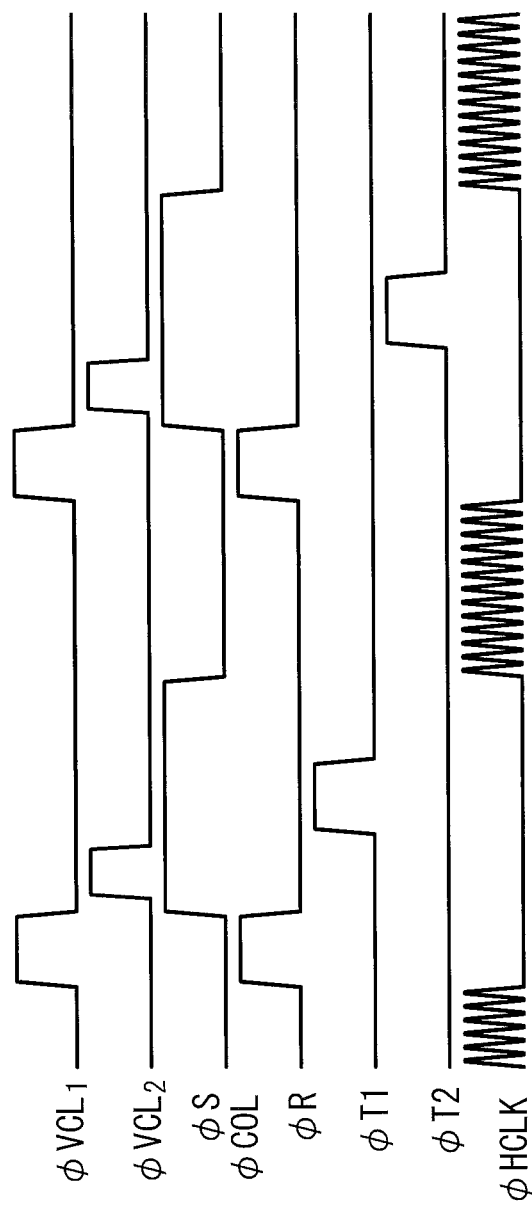
FIG. 6 is a timing chart showing an operation of the solid-state image pickup apparatus of FIG. 4.

An operation of the solid-state image pickup apparatus 30 according to the present embodiment configured as above will be described with reference to FIG. 6.

In the present embodiment, an operation of reading out noise voltage and signal-noise sum voltage from the two unit pixels 9 of each pixel group 31 is performed by repeating twice an operation of resetting the second vertical signal line 6*b* to a reset voltage in a state that noise voltage of one unit pixel 9 is outputted to the first vertical signal line 6*a* and held in the parasitic capacitance of the first vertical signal line 6*a* temporarily, outputting, after that, signal-noise sum voltage to the first vertical signal line 6*a*, and as a result, thereby reading out a difference between the signal-noise sum voltage and the noise voltage which appears in the second vertical signal line 6*b* to the horizontal signal line 7 by changing the unit pixel 9.

That is, in the present embodiment, the vertical shift register (pixel selection part) 3 outputs two transfer pulses φT1 to φT2 to the transfer transistors 12 of the two unit pixels 9. By the transfer pulses φT1 to φT2 being outputted from the vertical shift register 3 at different times, respectively, signal-noise sum voltages from the unit pixels 9 are outputted to the first vertical signal line 6*a* and kept at different times, respectively.

Then, by, after the difference between the signal-noise sum voltage and the noise voltage which appears in the second vertical signal line 6*b* being read out to the horizontal signal line 7, for all the pixel groups 31 in the selected line, changing the unit pixel 9 and repeating the same operation, signal voltage can be obtained from all the unit pixels 9.

As described above, according to the solid-state image pickup apparatus 30 according to the present embodiment, since the FD 13, the amplifier transistor 14 and the selection transistor 10 are shared, for every two unit pixels 9, there is an advantage that the number of elements other than the PD 11 in the pixel array 2 is reduced to realize downsizing or high resolution.

Figure 7:
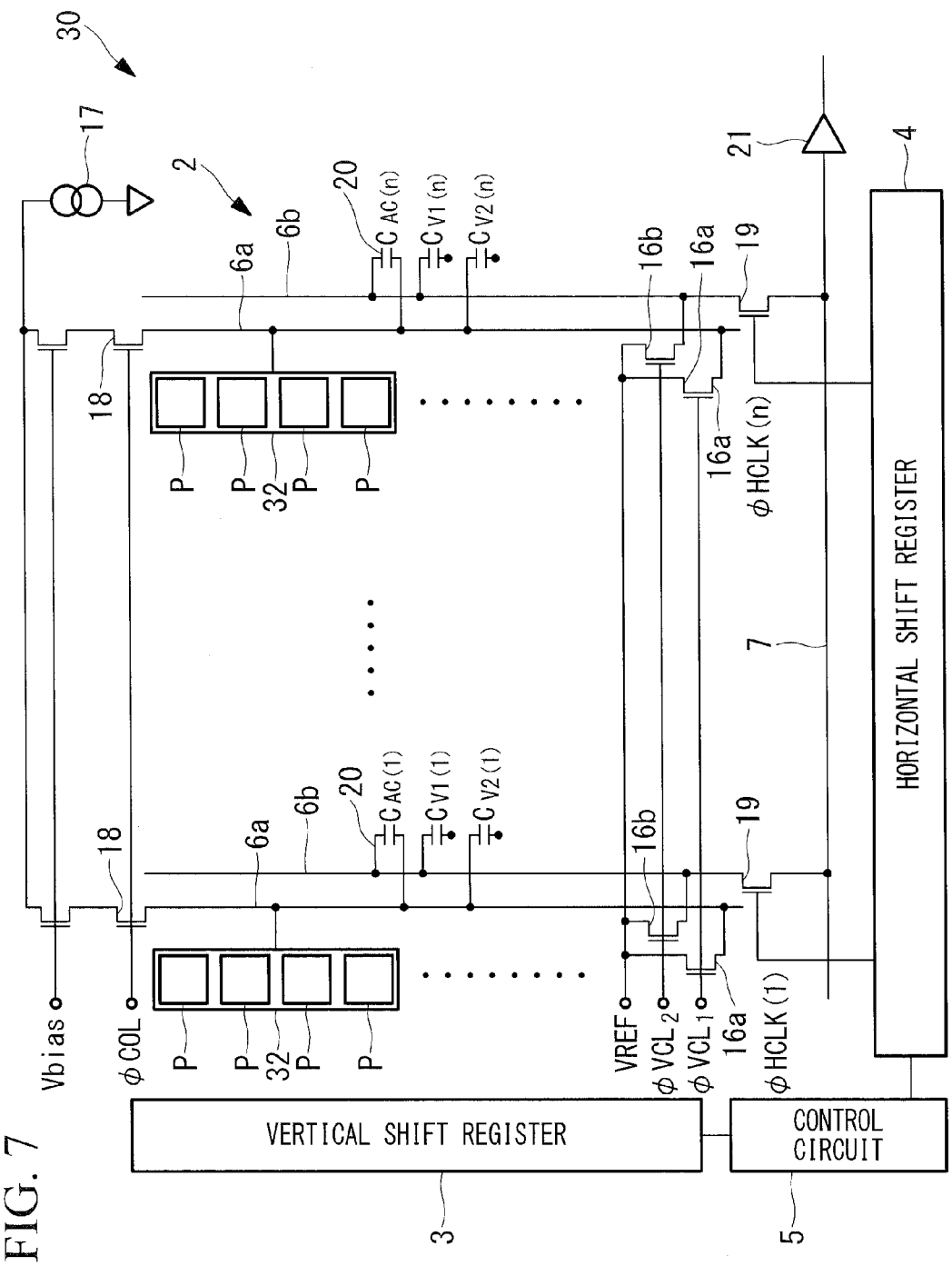
FIG. 7 is a circuit diagram showing a modification of the solid-state image pickup apparatus of FIG. 4.
Figure 8:
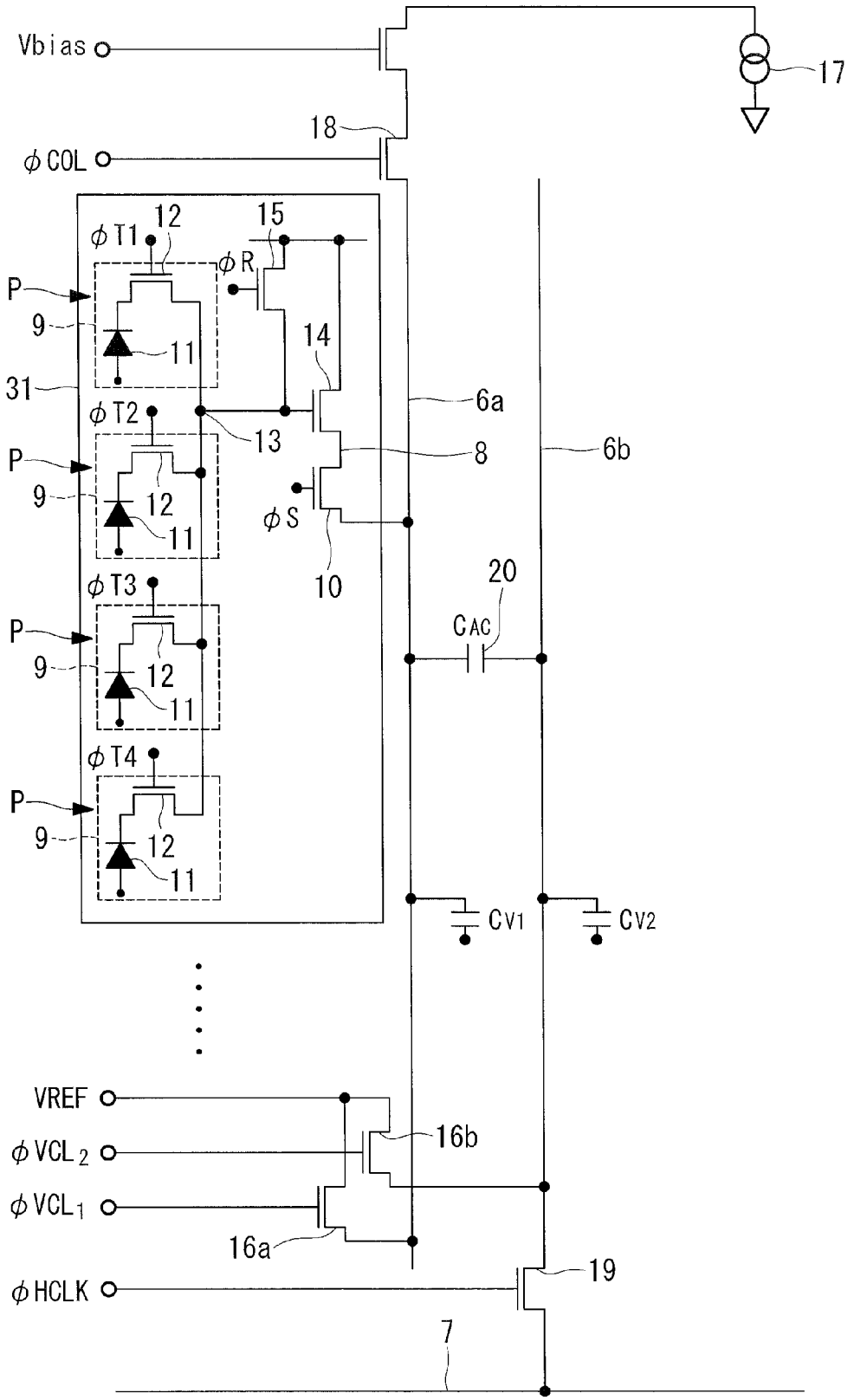
FIG. 8 is a circuit diagram showing a configuration of a column circuit including pixels which is provided for the solid-state image pickup apparatus of FIG. 7.
Figure 9:
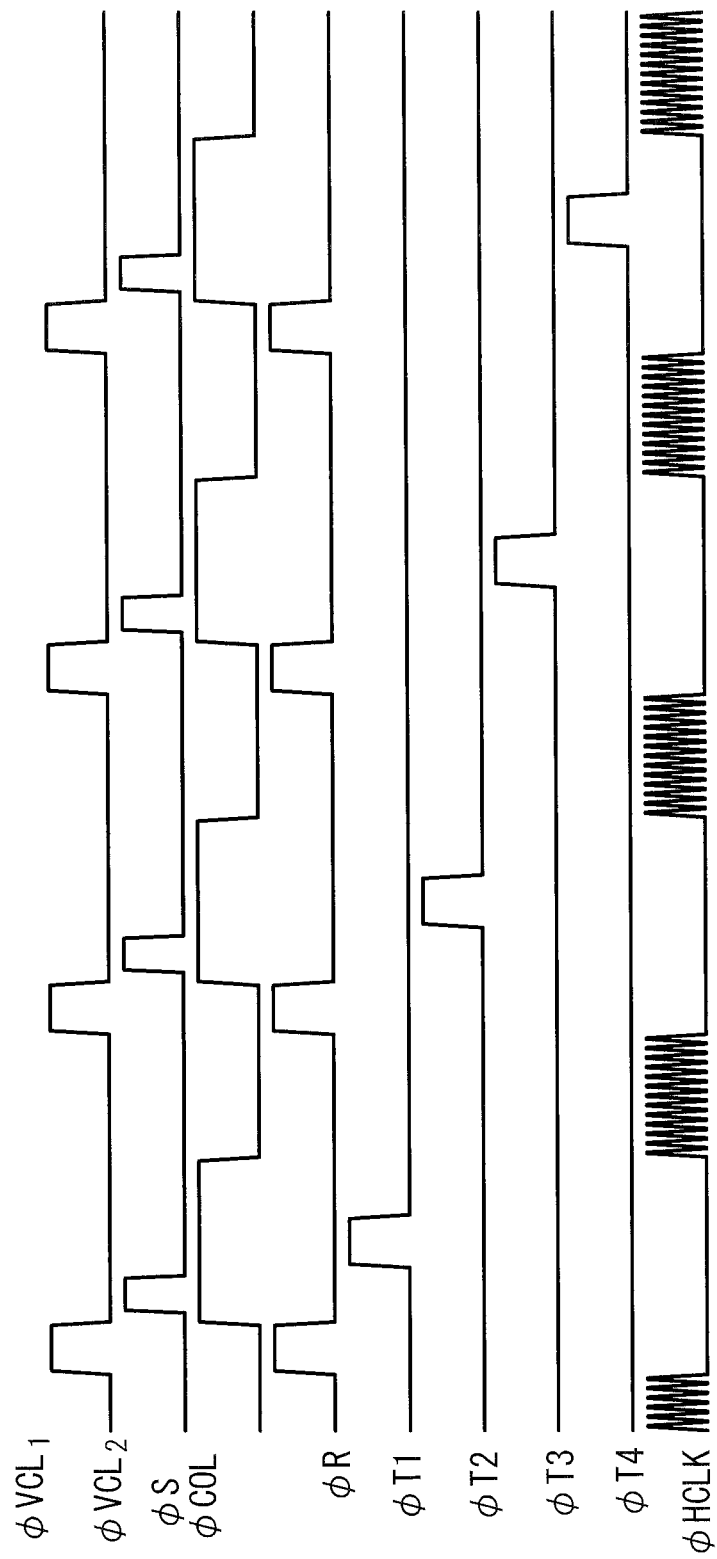
FIG. 9 is a timing chart showing an operation of the solid-state image pickup apparatus of FIG. 7.

In the present embodiment, description has been made, with the case where the pixel group 31 includes two unit pixels 9 as an example. However, this is not limiting. Any number of unit pixels 9 equal to or more than one may be included. For example, a pixel group 32 may include four unit pixels 9 as shown in FIGS. 7 to 9.

In the present embodiment, description has been made, with a so-called constant-current load type readout method in which, at the time of reading out noise voltage and signal-noise sum voltage to first vertical signal lines 6a, the readout is performed for a predetermined time while the first vertical signal lines 6a are connected to the constant current source 17 to cause a constant current to flow, as an example. However, instead, a capacity load type readout method may be adopted in which readout is performed without connecting to the constant current source 17.

Figure 10:
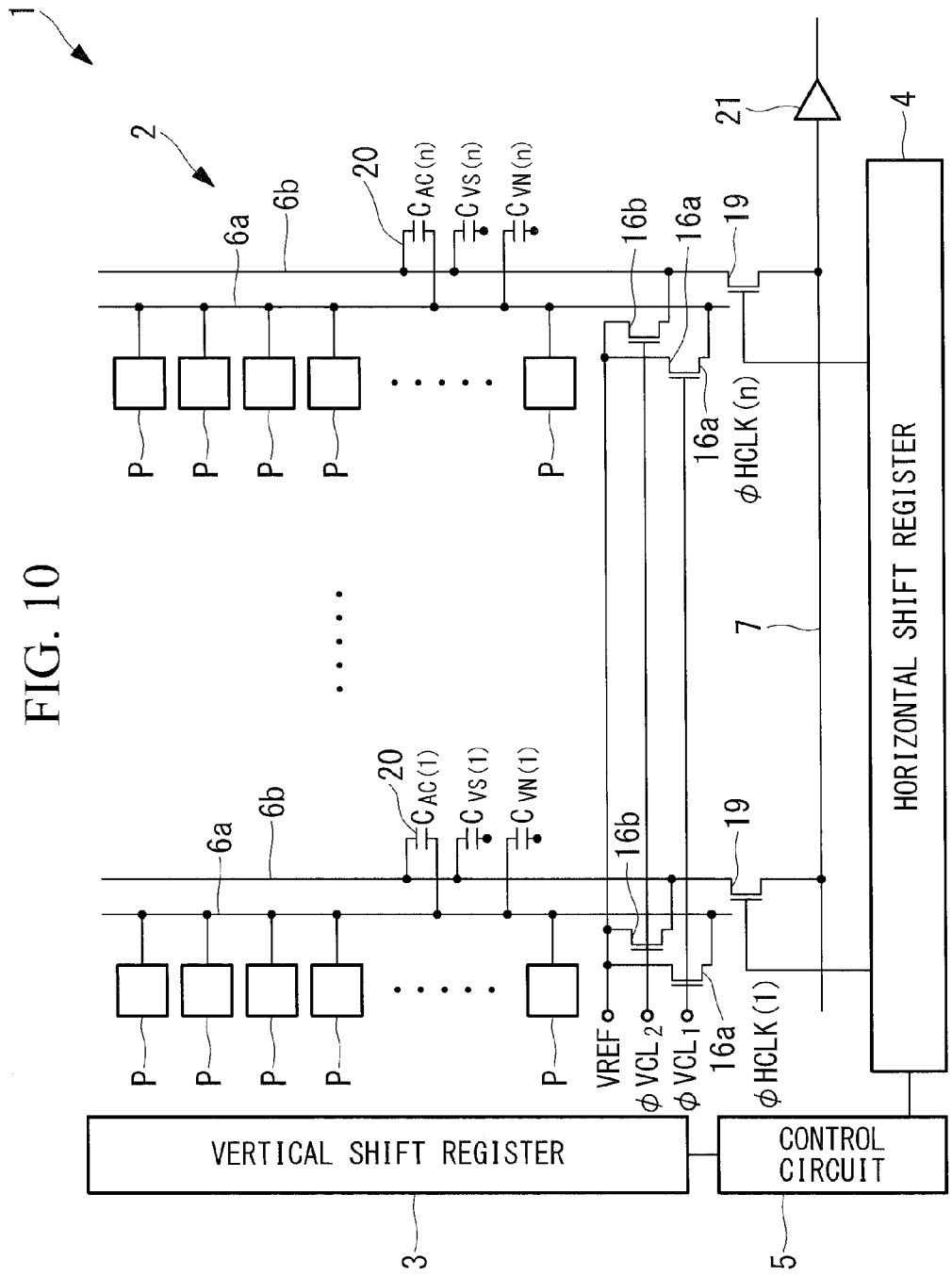
FIG. 10 is circuit diagram showing a configuration of a modification of the solid-state image pickup apparatus of FIG. 1, which is a capacity load type solid-state image pickup apparatus.
Figure 11:
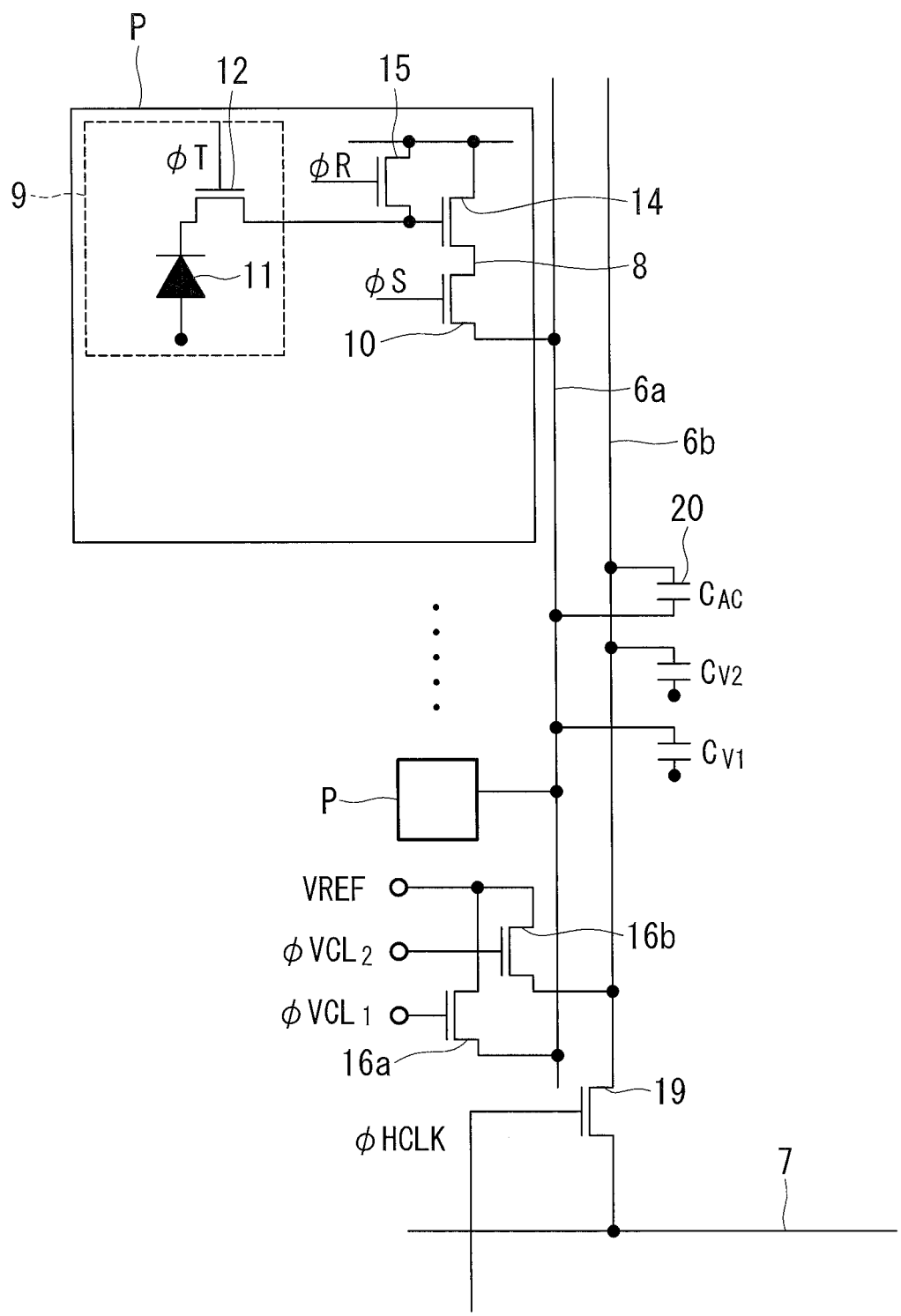
FIG. 11 is a circuit diagram showing a configuration of a column circuit including pixels which is provided for the solid-state image pickup apparatus of FIG. 10.
Figure 12:
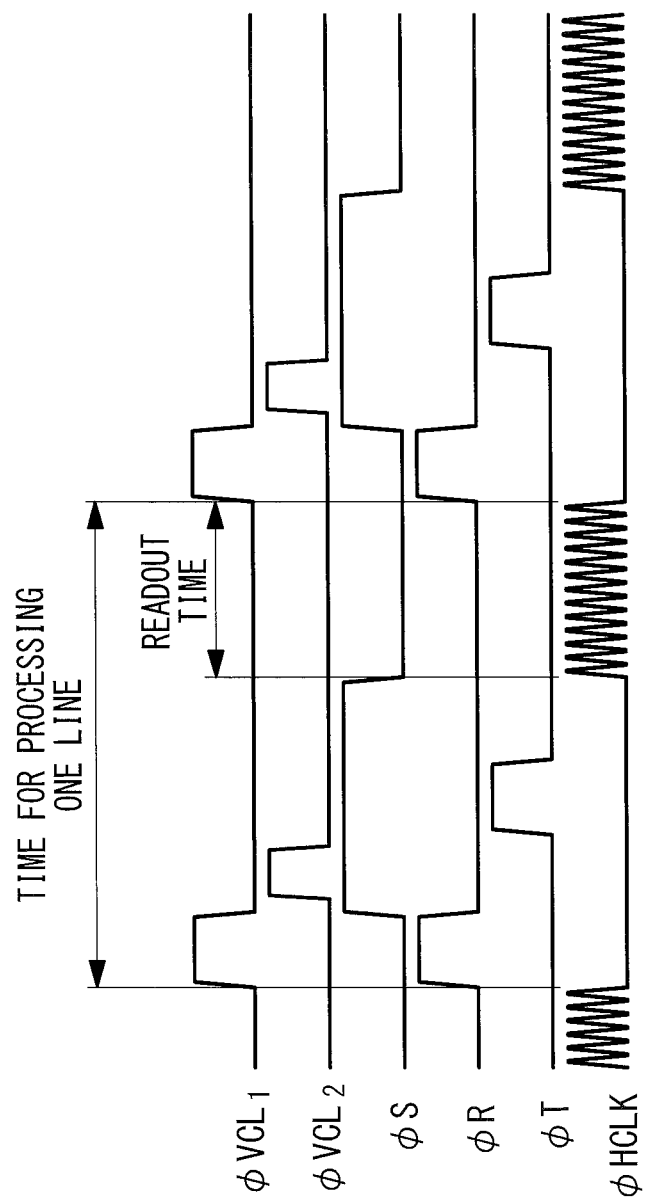
FIG. 12 is a timing chart showing an operation of the solid-state image pickup apparatus of FIG. 10.

A block diagram and a timing chart in the case of adopting the capacity load type readout method are shown in FIGS. 10 to 12, respectively. As for the case of the capacity load type also, the capacity load type can be applied to the pixel group 31 which includes a plurality of pixels P.

An advantageous effect similar to that of the constant-current load type can be obtained by this capacity load type also. Furthermore, since it is possible to do without the constant current source 17, the constant current source connection switch 18 and control signals therefor, there is an advantage that it is possible to more simply make a configuration and perform control.

In the case of the constant-current load type, the signal line reset transistor 16a which resets the first vertical signal lines 6a to the reset voltage VREF may not be provided.

Though the case of application to the pixel array 2 in which pixels are arrayed in a matrix shape has been shown as an example in the present embodiment, application to a pixel array in which pixels are arrayed in a honeycomb shape is also possible.

Furthermore, though it is assumed that the charge conversion element 13 converts a charge to voltage and outputs the voltage in the present embodiment, what converts a charge to a current and outputs the current may be adopted instead.

In the present embodiment, the parasitic capacitances of the vertical signal lines 6a and 6b are used to cause noise voltage and signal-noise sum voltage to be held in the vertical signal lines 6a and 6b. Thereby, it is possible to realize downsizing of the solid-state image pickup apparatuses 1 and 30 without necessity of a special capacitive element.

However, the present invention is not limited thereto. A capacitive element (not shown) may be connected to each of the vertical signal lines 6a and 6b. Thereby, the advantageous effect can be also obtained that it is possible to output a signal with a high noise immunity even if pixel output fluctuates during a readout period, due to reduction in time difference between noise voltage and signal-noise sum voltage.

The above-described embodiment leads to the following inventions.

An aspect of the present invention is a solid-state image pickup apparatus provided with: a plurality of two-dimensionally arrayed unit pixels, each of the unit pixels including an optical-electrical conversion element performing optical-electrical conversion of an incident light; a charge conversion element and an output terminal provided for each of a plurality of pixel groups, each pixel group including one or more of the unit pixels, the charge conversion element converting a signal charge optical-electrical converted by the optical-electrical conversion element of each of the unit pixels in the pixel group to voltage or current, and the output terminal being capable of outputting a noise signal that occurs at the time of resetting the charge conversion element and a signal-noise sum signal obtained by adding a signal that has occurred by optical-electrical conversion to the noise signal separately; a plurality of first transfer lines to which the output terminals of a plurality of the pixel groups are connected in common, the plurality of first transfer lines being capable of holding voltages based on signals outputted from the output terminals; a plurality of second transfer lines provided in parallel with the first transfer lines, the plurality of second transfer lines being capable of holding a voltage; inter-transfer-line capacitive elements connecting the second transfer lines and the first transfer lines; a reset switch resetting each of the second transfer lines to a reset voltage; a readout switch provided for each of the second transfer lines; and a third transfer line to which the second transfer lines are connected in parallel via the readout switches, respectively.

According to the present aspect, when an incident light enters the optical-electrical conversion element in a unit pixel belonging to each pixel group, a signal charge occurs by optical-electrical conversion and is held in the optical-electrical conversion element. In this state, the charge conversion element provided for each pixel group is reset. A noise signal which occurs by resetting the charge conversion element is outputted from the output terminal of each pixel group to each first transfer line and held in the first transfer line in a form of voltage with a magnitude corresponding to the noise signal (hereinafter referred to as noise voltage).

Next, in a state that the noise signal is outputted to the first transfer line from the output terminal of the pixel group, the second transfer line is reset to a reset voltage by the reset switch. Thereby, the reset voltage of the second transfer line connected via the inter-transfer-line capacitive element is stored as voltage indicating noise voltage of the first transfer line. After that, when the first transfer line is caused to be in a floating potential state, and a signal-noise sum signal is outputted from the output terminal of the pixel group to the first transfer line, the signal-noise sum signal is held in the first transfer line in a form of voltage with a magnitude corresponding to the signal-noise sum signal (hereinafter referred to as signal-noise sum voltage).

At this time, the voltage held in the first transfer line changes by a difference between the signal-noise sum voltage and the noise voltage (hereinafter referred to as signal voltage) before and after the output of the signal-noise sum signal. When the voltage of the first transfer line changes, the voltage of the second transfer line connected to the first transfer line via the inter-transfer-line capacitive element changes by the same difference due to capacitive coupling. The voltage of the second transfer line which has been reset to an already-known second voltage fluctuates by signal voltage corresponding to the amount of the incident light. Therefore, by switching the readout switch to an ON state, signal voltage from which noise has been removed can be read out to the third transfer line.

That is, according to the solid-state image pickup apparatus according to the present aspect, time difference between output of a noise signal of each unit pixel and output of a signal-noise sum signal can be short, and it is possible to, even pixel output fluctuates during a readout period, remove noise accurately and construct an image constituted by signals with a high noise immunity.

In the above aspect, the solid-state image pickup apparatus may be provided with a pixel selection part selecting the unit pixel to output a signal to the first transfer line from the output terminal of the pixel group, and a reset part resetting each of the first transfer lines to a first voltage; and the solid-state image pickup apparatus may cause the first transfer line to be in a floating potential state by, after causing the reset part to be in an ON state to reset the first transfer line to the first voltage, switching the reset part to an OFF state, and perform: a noise signal readout operation of, while reading out a noise signal outputted to the output terminal, to the first transfer line caused to be in the floating potential state, causing the reset switch to be in an ON state to reset the second transfer line to the reset voltage; and a signal-noise sum signal readout operation of, after causing the reset switch to be in an OFF state and causing the second transfer line to be in the floating potential state, reading out a signal-noise sum signal outputted from the unit pixel selected by the pixel selection part to the output terminal, to the first transfer line caused to be in the floating potential state.

By doing so, it is possible to directly read out the difference between a noise signal and a signal-noise sum signal of each unit pixel by a so-called capacity load type readout method with a simple configuration.

Furthermore, in the above aspect, the solid-state image pickup apparatus may be provided with: a pixel selection part selecting the unit pixel to output a signal to the first transfer line from the output terminal of the pixel group; and constant current circuit elements turning on/off supply of a constant current to the first transfer lines; and the solid-state image pickup apparatus may perform: a noise signal readout operation of, while reading out a noise signal outputted to the output terminal, to the first transfer line in a state of causing the constant current circuit element to be in an ON state to supply a constant current to the first transfer line, causing the reset switch to be in an ON state to reset the second transfer line to the reset voltage; and an operation of, after causing the reset switch to be in an OFF state to cause the second transfer lines to be in a floating potential state, reading out a signal-noise sum signal outputted from the unit pixel selected by the pixel selection part to the output terminal, to the first transfer line, in a state of causing the constant current circuit element to be in the ON state to supply a constant current to the first transfer line.

By doing so, it is possible to directly read out the difference between a noise signal and a signal-noise sum signal of each unit pixel accurately by a so-called constant-current load type readout method.

REFERENCE SIGNS LIST 1, 30 solid-state image pickup apparatus
3 vertical shift register (pixel selection part)
6a first vertical signal line (first transfer line)
6b second vertical signal line (second transfer line)
7 horizontal signal line (third transfer line)
8 output line (output terminal)
9 unit pixel
10 selection transistor
11 optical-electrical conversion element, PD
13 charge conversion element, FD
16a signal line reset transistor (reset part)
16b signal line reset transistor (reset switch)
18 constant current source connection switch (constant current circuit element)
19 vertical signal line selection switch (readout switch)
20 capacitive element (inter-transfer-line capacitive element)
31, 32 pixel group

The invention claimed is:

1. A solid-state image pickup apparatus comprising:
a plurality of two-dimensionally arrayed unit pixels, each of the unit pixels including an optical-electrical conversion element performing optical-electrical conversion of an incident light;
a charge conversion element and an output terminal provided for each of a plurality of pixel groups, each pixel group including one or more of the unit pixels, the charge conversion element converting a signal charge optical-electrical converted by the optical-electrical conversion element of each of the unit pixels in the pixel group to voltage or current, and the output terminal being capable of outputting a noise signal that occurs at the time of resetting the charge conversion element and a signal-noise sum signal obtained by adding a signal that has occurred by optical-electrical conversion to the noise signal separately;
a plurality of first transfer lines to which the output terminals of a plurality of the pixel groups are connected in common, the plurality of first transfer lines being capable of holding voltages based on signals outputted from the output terminals;
a plurality of second transfer lines provided in parallel with the first transfer lines, the plurality of second transfer lines being capable of holding a voltage;
inter-transfer-line capacitive elements connecting the second transfer lines and the first transfer lines;
a reset switch resetting each of the second transfer lines to a reset voltage;
a readout switch provided for each of the second transfer lines; and
a third transfer line to which the second transfer lines are connected in parallel via the readout switches, respectively.

2. The solid-state image pickup apparatus according to claim 1, comprising a pixel selection part selecting the unit pixel to output a signal to the first transfer line from the output terminal of the pixel group, and a reset part resetting each of the first transfer lines to a first voltage; wherein
the solid-state image pickup apparatus causes the first transfer line to be in a floating potential state by, after causing the reset part to be in an ON state to reset the first transfer line to the first voltage, switching the reset part to an OFF state, and performs:
a noise signal readout operation of, while reading out a noise signal outputted to the output terminal, to the first transfer line caused to be in the floating potential state, causing the reset switch to be in an ON state to reset the second transfer line to the reset voltage; and
a signal-noise sum signal readout operation of, after causing the reset switch to be in an OFF state and causing the second transfer line to be in the floating potential state, reading out a signal-noise sum signal outputted from the unit pixel selected by the pixel selection part to the output terminal, to the first transfer line caused to be in the floating potential state.

3. The solid-state image pickup apparatus according to claim 1, comprising:
a pixel selection part selecting the unit pixel to output a signal to the first transfer line from the output terminal of the pixel group; and constant current circuit elements turning on/off supply of a constant current to the first transfer lines; wherein the solid-state image pickup apparatus performs:

a noise signal readout operation of, while reading out a noise signal outputted to the output terminal, to the first transfer line in a state of causing the constant current circuit element to be in an ON state to supply a constant current to the first transfer line, causing the reset switch to be in an ON state to reset the second transfer line to the reset voltage; and an operation of, after causing the reset switch to be in an OFF state to cause the second transfer lines to be in a floating potential state, reading out a signal-noise sum signal outputted from the unit pixel selected by the pixel selection part to the output terminal, to the first transfer line, in a state of causing the constant current circuit element to be in the ON state to supply a constant current to the first transfer line.

\* \* \* \* \*